US009835392B2

(12) United States Patent
Neubert et al.

(10) Patent No.: US 9,835,392 B2
(45) Date of Patent: Dec. 5, 2017

(54) METHOD FOR PREVENTING AND DETECTING COOLANT DISCHARGES FROM COMPLEX HYDRAULIC SYSTEMS

(71) Applicant: DÜRR SOMAC GmbH, Stollberg (DE)

(72) Inventors: Dieter Neubert, Ehrenfriedersdorf (DE); Dany Dietel, Oederan (DE); Olaf Ulbricht, Neukirchen (DE); Andre Grimm, Treuen (DE); Thomas Achatz, Niederdorf (DE); Frank Wieland, Burkhardtsdorf (DE)

(73) Assignee: Dürr Somac GmbH, Stollberg (DE)

( * ) Notice: Subject to any disclaimer, the term of this patent is extended or adjusted under 35 U.S.C. 154(b) by 678 days.

(21) Appl. No.: 14/374,418

(22) PCT Filed: Jan. 23, 2013

(86) PCT No.: PCT/DE2013/000050
§ 371 (c)(1),
(2) Date: Nov. 12, 2014

(87) PCT Pub. No.: WO2013/110265
PCT Pub. Date: Aug. 1, 2013

(65) Prior Publication Data
US 2015/0083359 A1    Mar. 26, 2015

(30) Foreign Application Priority Data
Jan. 27, 2012    (DE) .................. 10 2012 001 906

(51) Int. Cl.
*G08B 21/00* (2006.01)
*F28F 27/00* (2006.01)
(Continued)

(52) U.S. Cl.
CPC .......... *F28F 27/00* (2013.01); *B60H 1/00585* (2013.01); *F25B 49/005* (2013.01); *F25B 45/00* (2013.01); *F25B 2500/222* (2013.01)

(58) Field of Classification Search
CPC ...... F28F 27/00; B60H 1/00585; F25B 45/00; F25B 2500/222; F25B 49/005; F25B 49/025
(Continued)

(56) References Cited

U.S. PATENT DOCUMENTS 4,711,096 A    12/1987 Krantz
5,481,883 A *  1/1996 Harkness, Jr. .......... F25B 45/00
                                                          165/71
(Continued)

FOREIGN PATENT DOCUMENTS

EP         0936417 A2     8/1999
WO    WO-2011/088831 A1   7/2011

OTHER PUBLICATIONS

International Search Report for PCT/DE2013/000050, ISA/EP, Rijswijk, NL, dated Jul. 15, 2013.

*Primary Examiner* — John A Tweel, Jr.
(74) *Attorney, Agent, or Firm* — Harness, Dickey & Pierce, P.L.C.

(57) ABSTRACT

The invention relates to a method for preventing and detecting coolant discharges from complex hydraulic systems. The aim of the invention is to configure such a method in such a way that this method in particular meets requirements for preventing/limiting the development of explosive atmospheres in working areas and for reducing measures from previously otherwise typical requirements for Ex zones. This aim is achieved in that a circuit carrying coolant is divided into small volumes that have stop valves and a relief
(Continued)

Figure 1:
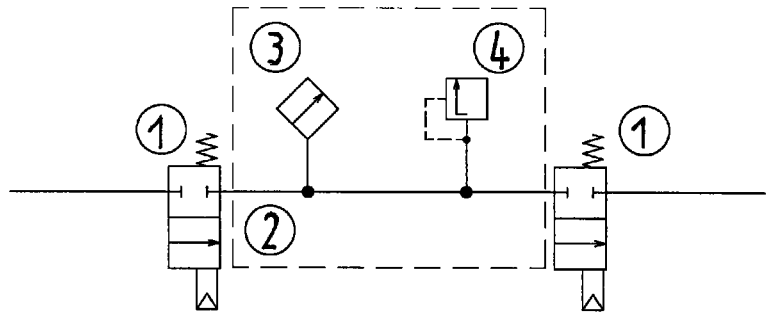

valve, wherein a leak detection diagnosis can be carried out by means of a pressure sensor that can be integrated.

7 Claims, 1 Drawing Sheet

(51) Int. Cl.
    *F25B 49/00*     (2006.01)
    *B60H 1/00*     (2006.01)
    *F25B 45/00*     (2006.01)

(58) Field of Classification Search
    USPC ......................................................... 340/605
    See application file for complete search history.

(56) References Cited

U.S. PATENT DOCUMENTS

| | | | |
|---|---|---|---|
| 6,073,455 A | 6/2000 | Tachigori et al. | |
| 6,321,544 B1 * | 11/2001 | Kanai | F25B 49/005 |
| | | | 62/126 |
| 7,165,421 B2 * | 1/2007 | Tsugawa | B60H 1/3225 |
| | | | 62/527 |
| 9,222,711 B2 * | 12/2015 | Ochiai | F25B 49/005 |
| 2013/0032220 A1 | 2/2013 | Cording | |

* cited by examiner

METHOD FOR PREVENTING AND DETECTING COOLANT DISCHARGES FROM COMPLEX HYDRAULIC SYSTEMS

CROSS REFERENCE TO RELATED APPLICATIONS

This is a U.S. National Phase Application under 35 USC 371 of PCT/DE2013/000050, filed Jan. 23, 2013 and published in German as WO/2013/110265 A2 on Aug. 1, 2013. This application claims priority to German Application No. 10 2012 001 9068, filed Jan. 27, 2012. The disclosures of the above applications are incorporated herein by reference.

FIELD

The present disclosure relates to systems and methods for filling hydraulic systems, including automotive air conditioning systems, with coolant.

BACKGROUND AND SUMMARY

On assembly lines in the automotive industry, vehicle air conditioning systems (MAC's mobile air conditions) are filled with coolant. This filling is carried out by filling systems, which automatically enable the entire filling process in adaptation to the vehicle air conditioning system. The coolants used pose a strain to the environment, are partially combustible and often produce hazardous decomposition products. For this reason, there are high safety requirements on the tightness of such filling systems, so that coolant discharges can be excluded or diagnosed.

Since coolants are liquefied gases, states of matter and pressure levels must be considered. In particular, a temperature-induced rise in pressure in lines and equipment of such filling systems must be taken into account in design. Even an amount of coolant released in the event of an accident should be limited in order to prevent or minimize risks with regard to a harmful explosive atmosphere.

Filling systems are characterized by an integrated vacuum and filling circuit with means for sensing vacuum, pressure, and mass determination, a media supply section that is fed from bottles or tanks, an adapter device for connecting the filling interface in the vehicle, and a control system that initiates the automatic filling sequence. The pressure test, evacuation, leak test, post-evacuation, filling, and coolant suck back functions are combinable partial functions of a typical overall process. This process is mainly performed at assembly lines in the reworking, tryout, and vehicle development departments.

It is the object of the invention to provide a method for operating filling systems for coolants which in particular meets the following requirements:

1. Limitation of coolant discharge quantities in the event of a failure or accident
2. Prevention and limitation of harmful explosive atmospheres when working with combustible coolants or coolants that are environmental or health hazards
3. Protection of hydraulic circuits from too high pressures
4. Prevention of coolant discharge from relief valves
5. Diagnosis of leaks This object is achieved with the technical features according to claim 1 and advantageous embodiments, as described in the dependent claims; essential features and advantages include:

The method according to the invention for preventing and detecting coolant discharges from complex hydraulic systems is characterized in that a circuit that carries coolant is divided into small volumes having stop valves and one relief valve. Leak detection diagnosis can be performed in a simple manner using a pressure sensor that can be integrated in the system. As a result, required explosion protection precautions and restrictions that were required in the filling environment can be reduced.

Activation of the relief valves is prevented by removing pressure or volume into an accumulator used by all clusters and by decoupling the clusters from one another using check valves. The accordingly designed clusters—which will be explained in greater detail with reference to the drawing—can be integrated in the hydraulics of the filling system. It is also possible that these clusters form an integral part of the hydraulic system for configuring the functions of the overall process.

Continuous leak diagnosis can be performed using the pressure measuring equipment in each cluster, both during the operation of the filling system and the filling process itself and during the service life of the system and beyond.

Furthermore, the requirements listed above (as described under requirements numbered 1 to 5) can be achieved in that technically leak tight systems will achieve a "permanently leak tight" state with the measures mentioned. At the same time, filling systems equipped with these features have to meet reduced requirements with respect to explosion protection precautions to be taken.

Another advantage of this method is that the pressure measuring equipment in conjunction with exhaust systems provides for a more sensitive leak detection compared to installing additional gas warning sensors because the actual gas warning sensors are adversely affected by the air change rates.

Finally, regular leak detection with pressure measuring equipment in conjunction with ventilation equipment and gas warning sensors may form a part of measures with which technically leak tight systems can be reclassified as permanently leak tight systems. This results in operating cost savings for the operator, e.g. when troubleshooting with the doors open and the system running.

Decisive advantages of the overall method therefore include limitation of the development of harmful explosive atmospheres in working areas and reduction of measures from otherwise typical requirements for Ex zones as well as the reduction of such zones. Furthermore, the requirements the method has to meet do not obstruct the actual filling process and the required components can be directly integrated in the hydraulic circuits of the filling system or even form a functionally determined part thereof.

DRAWINGS

Figure 2:
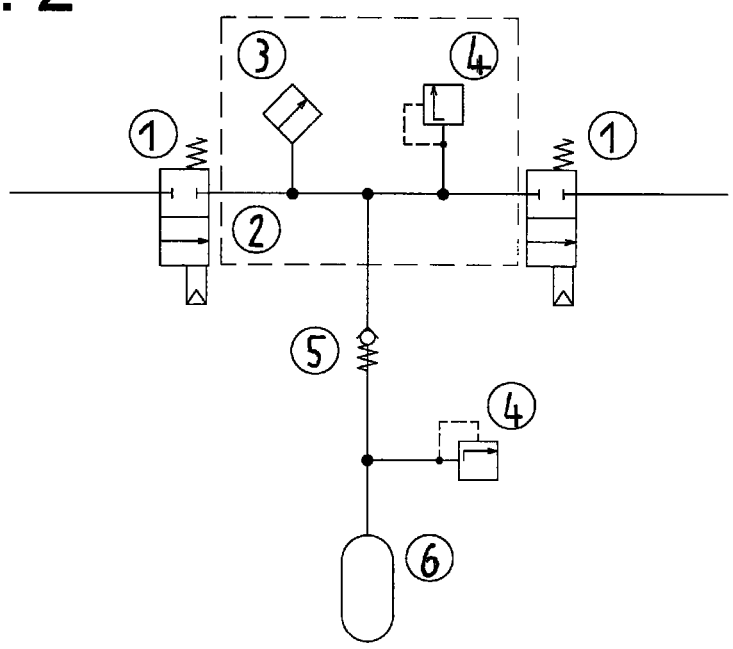

FIG. 1 shows a schematic view of a small-volume coolant-carrying hydraulic system according to the present disclosure; and FIG. 2 shows a schematic view of an alternate small-volume coolant-carrying hydraulic system according to the present disclosure.

DETAILED DESCRIPTION

An embodiment of the invention is explained below with reference to the drawings.

Keeping the discharge quantities of coolant in the event of failure or an accident small as required under 1 and 2 is achieved by clustering the coolant-carrying hydraulic systems into small volumes.

FIG. 1 shows such a cluster 2. It consists of pipelines with operating media and is separated by two valves 1 from the rest of the hydraulic system. A relief valve 4 prevents impermissibly high pressures in this cluster 2 and thus fulfills the requirements described above at number 3.

If such hydraulic clusters are closed in the event of a failure or accident or when the filling system is switched off, the problem of increased pressure in the cluster itself arises as a result of an increase in ambient temperature or, if the system is in operation, as a result of volume displacement due to switching valves. Since the coolant is in its liquid phase, small temperature changes or volume changes have a significant pressure-increasing effect. This results in most cases in the activation of the relief valve 4.

Pressure increase in cluster 2 according to FIG. 1 will be slow if the temperature rises, and the relief valve 4 will open slowly. The closing point is typically far below the opening pressure due to hysteresis effects. This results in the release of uncontrollable quantities of coolant and is undesirable.

To prevent this, a check valve 5 is added to the hydraulic cluster according to FIG. 2. The check valve 5 runs into a special cluster that contains a bladder or diaphragm-type accumulator 6. Other clusters may be connected to this cluster. The check valves 5 decouple these clusters from one another.

If the pressure in the cluster increases as a result of an increase in temperature or due to switching operations, these pressure increases are relieved into the bladder accumulator. The accumulator 6 can absorb these effects because they are based on small volumes only. The relief valves are only opened in extreme pressure-increasing situations, which are not taken into account here. Therefore, the requirements under 3 and 4 have been implemented as well.

Since the coolant in the coolant-carrying circuits of the filling system is in its liquid phase, even small leaks cause pressure drops that can well be detected using pressure sensors 3. The measuring times can be selected such that the filling process is not disturbed and that temperature variations do not impair the result of the pressure drop measurement. Since each cluster is equipped with such pressure measuring devices, the locations of leaks can be detected, which is a great advantage. This means that the requirement described above at number 5 is met as well.

The invention claimed is:

1. A method for preventing and detecting coolant discharges from a hydraulic filling system,
   wherein a circuit carrying coolant is divided into a plurality of clusters containing small volumes and having stop valves and a relief valve, wherein a pressure sensor is integrated in each cluster for performing leak detection diagnosis such that required explosion protection measures and restrictions in the working environment of a filling system can be reduced; and
   wherein activation of the relief valves is avoided in that pressure/volume is relieved into an accumulator in fluid communication with each of the clusters, and in that each of the clusters is decoupled from one another using check valves.

2. The method according to claim 1, wherein a continuous leak diagnosis is performed using pressure measuring equipment in each cluster, both during the operation of the hydraulic filling system and the filling process itself and during the service life of the hydraulic filling system.

3. A method for preventing and detecting coolant discharges from coolant-carrying hydraulic systems, comprising:
   dividing the hydraulic system into a plurality of circuits each circuit containing a volume of coolant less than a total volume of coolant in the hydraulic system;
   isolating each circuit from the remainder of the hydraulic system and each other circuit by a first valve and a second valve;
   providing a relief valve in each circuit intermediate the first valve and the second valve, the relief valve opening at a first pressure;
   providing a pressure sensor in each circuit intermediate the first valve and the second valve;
   providing a check valve in each circuit located intermediate the first valve and the second valve, the check valve opening at a second pressure lower than the first pressure;
   providing an accumulator in fluid communication with each of the check valves in each of the plurality of circuits;
   opening a respective check valve in any one of the plurality of circuits when an operating pressure in the any one of the plurality of circuits reaches the second pressure wherein at least a portion of the coolant in the any one of the plurality of circuits is vented into the accumulator via the respective check valve and activation of a respective relief valve in the any one of the plurality of circuits is avoided.

4. The method according to claim 3 further comprising: providing a second relief valve in each circuit intermediate the check valve and the accumulator.

5. A coolant-carrying hydraulic system, comprising:
   a plurality of hydraulic circuits, wherein each of the plurality of hydraulic circuits contains a volume of coolant less than a total volume of coolant in the hydraulic system;
   wherein each of the plurality of hydraulic circuits is isolated from the remainder of the hydraulic system and each other one of the plurality of hydraulic circuits by a first valve and a second valve;
   a relief valve located intermediate the first valve and the second valve in each of the plurality of hydraulic circuits, the relief valve opening at a first pressure;
   a pressure sensor located intermediate the first valve and the second valve in each of the plurality of hydraulic circuits;
   a check valve located intermediate the first valve and the second valve in each of the plurality of hydraulic circuits, the check valve opening at a second pressure lower than the first pressure;
   an accumulator in fluid communication with each of the check valves in each of the plurality of hydraulic circuits;
   wherein a respective check valve in any one of the plurality of hydraulic circuits opens responsive to an operating pressure in the any one of the plurality of hydraulic circuits reaching the second pressure; and
   wherein at least a portion of the coolant in the any one of the plurality of hydraulic circuits is vented into the accumulator via the respective check valve and activation of a respective relief valve in the any one of the plurality of hydraulic circuits is avoided.

6. The coolant-carrying hydraulic system according to claim 5 further comprising:
   a second relief valve in each of the plurality of hydraulic circuits located intermediate the respective check valve for each of the plurality of hydraulic circuits and the accumulator.

7. The coolant-carrying hydraulic system according to claim 5 wherein the coolant-carrying hydraulic system is a permanently leak tight system.

* * * * *